(12) United States Patent
Shorey

(10) Patent No.: US 6,299,106 B1
(45) Date of Patent: *Oct. 9, 2001

(54) THERMAL INSULATION UTILIZING A LOW PROFILE SNAP FASTENER

(75) Inventor: Mark W. Shorey, Des Moines, WA (US)

(73) Assignee: The Boeing Company, Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/264,605

(22) Filed: Mar. 9, 1999

(51) Int. Cl.[7] .................................................. B64G 1/58
(52) U.S. Cl. ...................................... 244/158 A; 403/428
(58) Field of Search .............................. 244/158 A, 119; 52/404.1, 404.2, 406.1, 406.2, 406.3; 403/328, 327, 322.2

(56) References Cited

U.S. PATENT DOCUMENTS

| 2,402,925 | | 6/1946 | Spooner ...................................... 85/5 |
| 2,901,804 | | 9/1959 | Williams ................................. 24/211 |
| 3,117,484 | | 1/1964 | Myers ........................................ 85/5 |
| 3,233,496 | | 2/1966 | DePew et al. ............................. 85/5 |
| 3,827,110 | | 8/1974 | Dzus, Sr. et al. ....................... 24/221 |
| 3,896,698 | | 7/1975 | Aylott ........................................ 85/7 |
| 4,453,449 | * | 6/1984 | Hollmann . |
| 4,456,208 | * | 6/1984 | MacConochie et al. . |
| 4,906,123 | * | 3/1990 | Weskamp et al. . |
| 4,919,366 | * | 4/1990 | Cormier . |
| 5,154,373 | * | 10/1992 | Scott . |
| 5,178,922 | * | 1/1993 | Ferrier et al. . |
| 5,207,544 | | 5/1993 | Yamamoto et al. .................. 411/348 |
| 5,452,979 | | 9/1995 | Cosenza ............................... 411/348 |
| 5,489,074 | * | 2/1996 | Arnold et al. . |
| 5,494,323 | | 2/1996 | Huang .................................. 292/252 |
| 5,511,747 | * | 4/1996 | Parrot et al. . |
| 5,642,960 | * | 7/1997 | Salice . |
| 5,759,659 | * | 6/1998 | Sanocki et al. . |
| 5,797,643 | * | 8/1998 | Demedash . |

\* cited by examiner

Primary Examiner—Charles T. Jordan
Assistant Examiner—Tien Dinh
(74) Attorney, Agent, or Firm—Lawrence W. Nelson

(57) ABSTRACT

A thermal insulating blanket for insulating a surface from extreme external temperatures. The blanket includes ceramic fiber batting that insulates the surface from the external temperatures, a frame for supporting the ceramic fiber batting and preventing the ceramic fiber batting from sagging, and a ceramic fabric cover enclosing the ceramic fiber batting and the frame. The ceramic fabric cover defines a first side of the blanket facing externally, and a second side opposite the first side and facing the surface. The blanket also includes a low profile fastener for coupling the blanket to the surface. The fastener is coupled and decoupled from the surface by applying pressure to the first side of the blanket proximate the fastener.

19 Claims, 6 Drawing Sheets

THERMAL INSULATION UTILIZING A LOW PROFILE SNAP FASTENER

BACKGROUND OF THE INVENTION

1. Field of the Invention

The present invention relates to a method of installing thermal insulation, and more particularly, to a method and device for quickly fastening and unfastening a thermal blanket to the skin of a spacecraft.

2. Background Information

Reusable space launch vehicles, such as the space shuttle, are exposed to extreme cold and extreme heat. For example, in contrast to the subzero temperatures encountered in space, a space launch vehicle may be exposed during reentry to hull temperatures exceeding 1,800° F. Some form of thermal insulation is required to protect the space launch vehicle from these extremes in temperature. Currently, the space vehicles use ceramic tiles as protection. However, it has been suggested that as an alternative, flexible quilted ceramic blankets 20, as shown in FIG. 1, could be used to cover the exteriors of such space vehicles for protection.

The proposed flexible blankets 20, shown in FIG. 1, are constructed of a fiber batting 22. The batting 22 is surrounded by a cover material 24, and quilted with ceramic thread 26 to form the blanket 20.

The blankets 20 are mounted onto a hull exterior 29 of the space vehicle 28 with a silicon rubber adhesive 30, as shown in FIG. 2. Unfortunately, the blankets 20 when adhered to a structure using the silicon rubber adhesive 30, often do not withstand high acoustic loads to which the space vehicle 28 are subjected during reentry. Acoustical loads of this magnitude often cause the quilting threads to break, and the batting to separate and puff up. This reduces the performance of the insulating blanket to unacceptable levels. Another disadvantage of mounting the blankets 20 with the silicon adhesive 30 is that the adhesive 30 becomes brittle over areas having very low temperatures, such as over cryotanks.

Yet another disadvantage of mounting the blankets 20 onto the space vehicle 28 using the silicon rubber adhesive 30, as shown in FIG. 2, is that the blankets 20 must often be removed and replaced for inspection, repair, or to obtain access to various hatches. The current process for removing the blankets 20 requires the blankets 20 to be literally scraped off the hull 29 of the launch vehicle 28. The removal process is both time consuming and expensive. Since turnaround time for reusable launch vehicles is increasingly critical to their success, the extensive time required for the removal and replacement of insulation blankets mounted with adhesive is unacceptable.

Attempts to replace the silicon rubber adhesive 30 with a mechanical device have so far failed because the mechanical devices have failed to prevent the blankets 20 from sagging in the areas where the blankets were not mechanically fastened to the vehicle hull 29. When attempts to mechanically fasten the blankets 20 to the hull 29 were attempted, the mechanical fastener was exposed on the exterior of the blanket to enable the use of tooling to remove and install the blanket 20 onto the hull 29 of the vehicle 28. Unfortunately, testing showed that these exposed areas act as heat sinks, which draw the heat of reentry into the hull causing hull failure. Further, any attempts to attach the mechanical devices to the hull 29 would be difficult to remove once drilled or welded to the exterior of the hull 29.

Accordingly, there is a need in the art for a means of quickly installing and removing the flexible blankets 20 from the hull 29 of the space vehicle 28. Further, any means for holding the blankets in position must prevent sagging, and be reliable even when exposed to intense vibration and heat, typically encountered during a space vehicle's reentry into the earth's atmosphere.

SUMMARY OF THE INVENTION

In one aspect, the present invention relates to a thermally insulated spacecraft including a skin external to the spacecraft, a plurality of studs affixed to the skin, and an insulating blanket for positioning over at least a portion of the skin. The blanket includes a frame member forming a shape having a plurality of corners, ceramic fiber batting supported by the frame, ceramic fabric cover sewn over the ceramic fiber batting, a mounting flange positioned in each of the plurality of corners of the frame members, and a snap fastener seated in each mounting flange for coupling the insulating blanket to the plurality of studs. The snap fastener has a base intersecting the mounting flange. The base includes a barrel having a length perpendicular to the frame member wherein the barrel has at least two orifices in a plane orthogonal to a radial axis of the barrel. The fastener also has a plurality of balls, each sized to fit a respective one of the at least two orifices, a fastener for holding a first end of the base onto the mounting flange, a cap positioned adjacent a second end of the base, a spring positioned between the cap and the second end opposite of the first end of the base, and a collar press fit into a lower portion of the cap to limit the movement of the cap from the base.

In another aspect, the present invention relates to a thermal insulating blanket for insulating a surface from extreme external temperatures. The blanket includes ceramic fiber batting that insulates the surface from the external temperatures, a frame for supporting the ceramic fiber batting and preventing the ceramic fiber batting from sagging, and a ceramic fabric cover enclosing the ceramic fiber batting and the frame. The ceramic fabric cover defines a first side of the blanket facing externally, and a second side opposite the first side and facing the surface. The blanket also includes a low profile fastener for coupling the blanket to the surface, the fastener coupled and decoupled from the surface by applying pressure to the first side of the blanket proximate the fastener.

In yet another aspect, the present invention relates to a method for engaging and disengaging a rectangular thermal blanket, which is filled with insulating material and has a plurality of low profile snap fasteners, each covered by the insulating material and coupled to a respective corner of the blanket, with a surface having a plurality of studs. The method includes the steps of aligning each of the studs with a corresponding one of the snap fasteners, applying pressure over each corner of the thermal blanket until the thermal blanket is secured to the surface, and applying pressure over each corner of the thermal blanket proximate to the respective snap fastener until it disengages from a respective one of the studs and removing the thermal blanket from the surface.

DETAILED DESCRIPTION OF THE PREFERRED EMBODIMENTS

Figure 1:
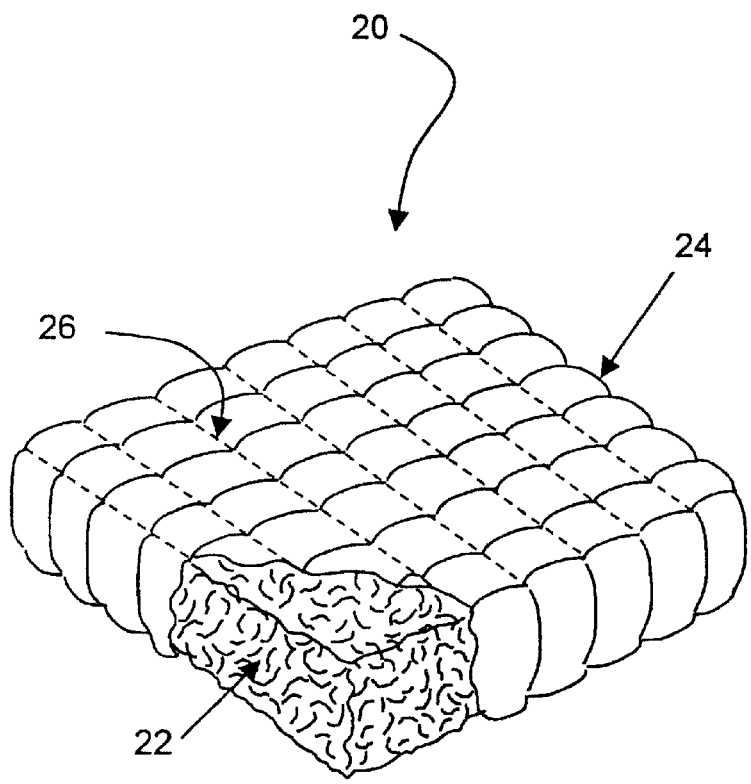
FIG. 1 is a perspective view, partially cut away, of the flexible quilted ceramic blanket.
Figure 2:
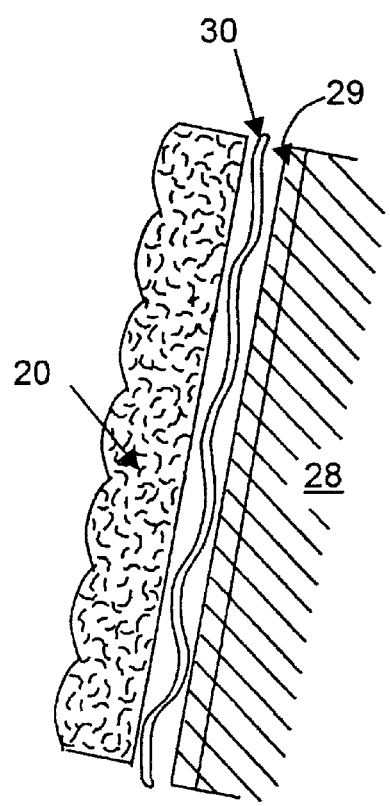
FIG. 2 is a side view of the blanket adhered to a hull of a reusable space launch vehicle.
Figure 3:
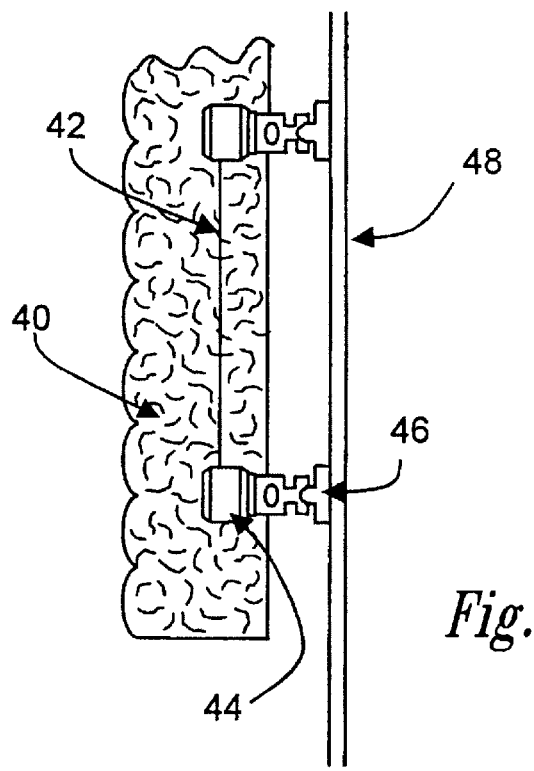
FIG. 3 is a cross-sectional side view of a device for fastening or unfastening the thermal blanket to the hull of the spacecraft of the present invention.

As shown in FIG. 3, a flat rectangular insulating blanket 40 includes a frame member 42, and at least four low profile quick release or snap fasteners 44, which engage studs 46. The studs 46 are adhesively bound to the hull 48 of a space reentry vehicle. Although the illustrated embodiment of the insulating blanket 40 is particularly suitable for reusable launch vehicles, the blanket 40 may be used for a variety of insulating applications.

The snap fasteners 44, preferably made of titanium, are constructed in such a manner that they may be embedded within the blanket 40 and allow the blanket 40 to be either engageable or disengageable with the studs 46. Since the blanket 40 is not adhered to the hull 48 with an adhesive, it is easily installed and removed, yet because the fasteners 44 are embedded within the blanket and are engageable to and releasable from the studs 46 without the use of tooling, the fasteners 44 are easily put in engage and disengage without acting as a heat sink during reentry.

Figure 4:
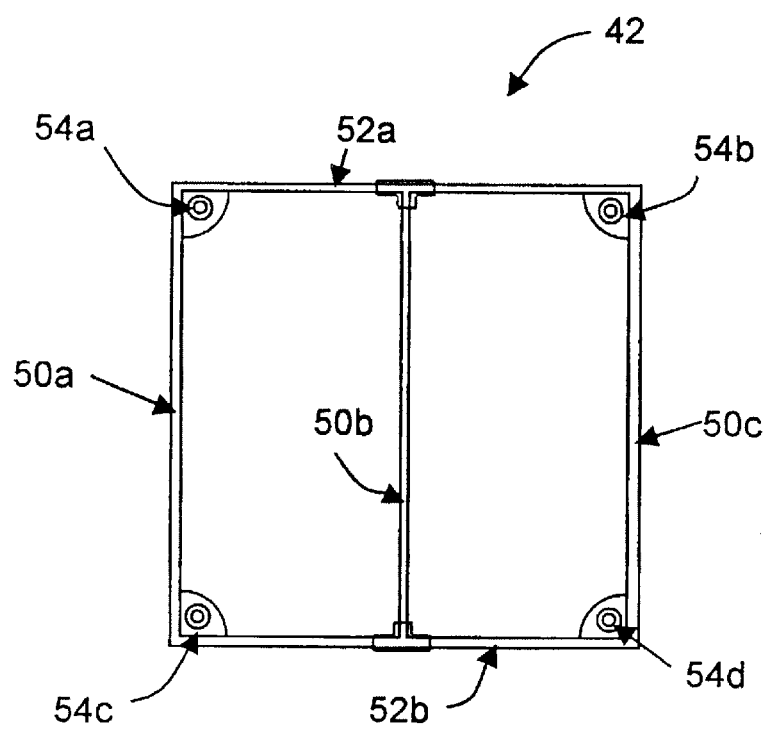
FIG. 4 is a plan view of the first embodiment of the present invention.

The frame member 42, as shown in FIG. 4, includes three length-wise members 50a, 50b, and 50c coupled between two width-wise members 52a and 52b. Preferably, the members of the frame 42 are 0.25-inch tubular titanium. Mounting flanges 54a–54b are positioned at outer corners, where the length-wise 50a–c, and width-wise 52a and 52b members meet.

Figure 5A:
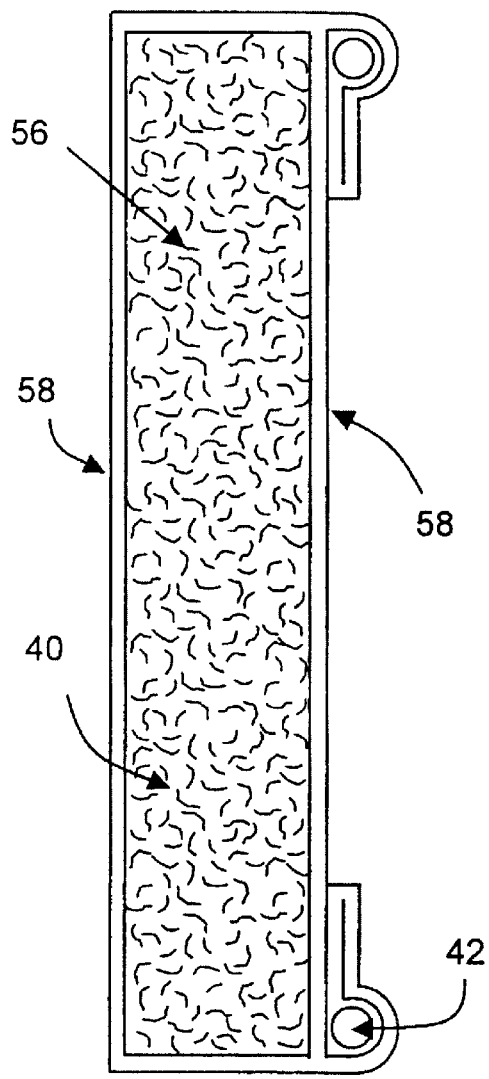
FIG. 5a is a top view of the blanket frame portion of the present invention.
Figure 5B:
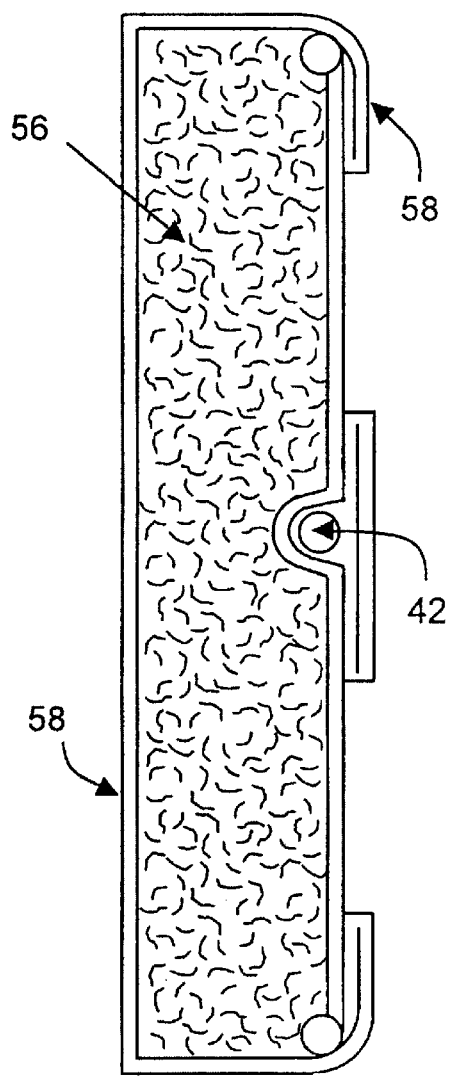
FIG. 5b is a side view of the blanket frame portion of the present invention.

FIG. 5a shows the blanket 40 fastened to the frame 42. The blanket includes a ceramic fiber batting, preferably Saffil™ 56, surrounded by a ceramic fabric cover 58, preferably Nextel™, which is sewn into the frame 42 both length-wise and width-wise, as respectively shown in FIGS. 5a and 5b.

Figure 6:
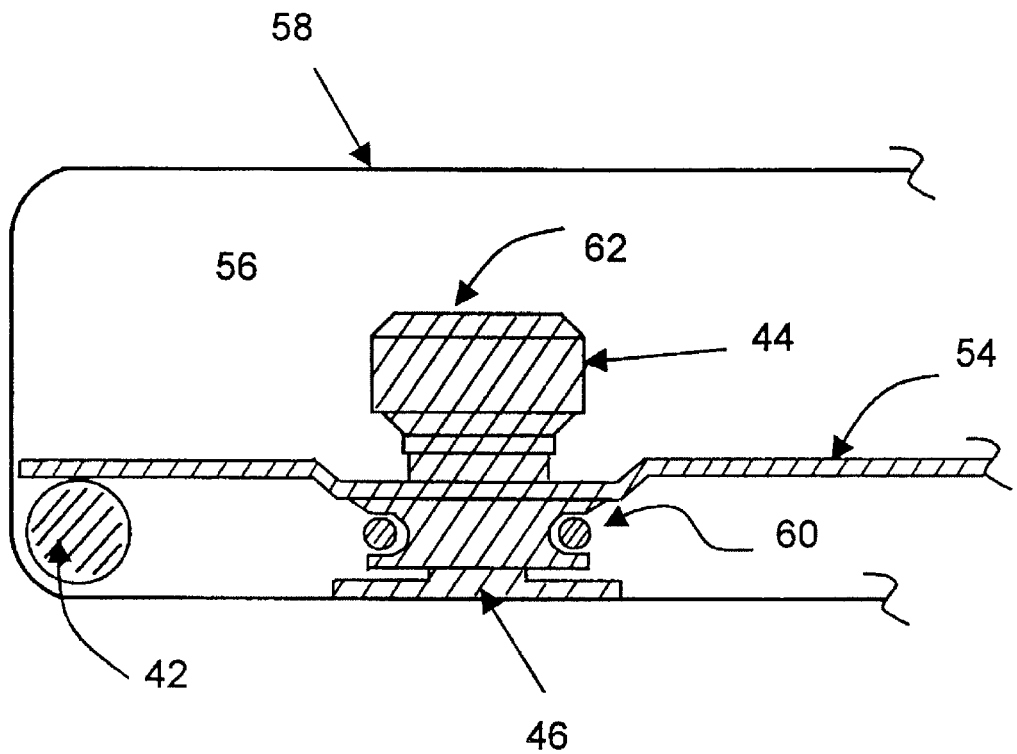
FIG. 6 is a side view of a snap fastener portion of the first embodiment of the present invention.

As shown in FIG. 6, the snap fastener 44 is coupled to the mounting flange 54 with a locking clip 60. However, other forms of coupling devices, including adhesives, screws, or pins could be substituted for the clip 60. The clip 60 is preferable because it engages the snap fastener 44 in a manner such that the snap fastener 44 may float within the mounting flange by at least 20 to 30 millimeters. The float of the flange enables an operator to more easily align the blanket 40 with the plurality of studs 46. The float also allows for thermal expansion of the unit during reentry.

Figure 7:
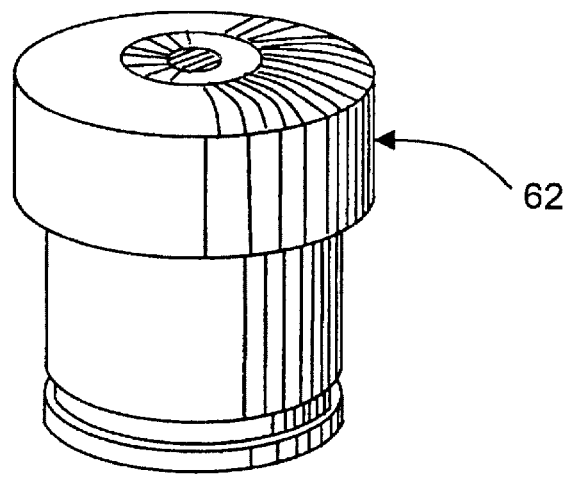
FIG. 7 is an isometric view of the snap fastener of the present invention.
Figure 8:
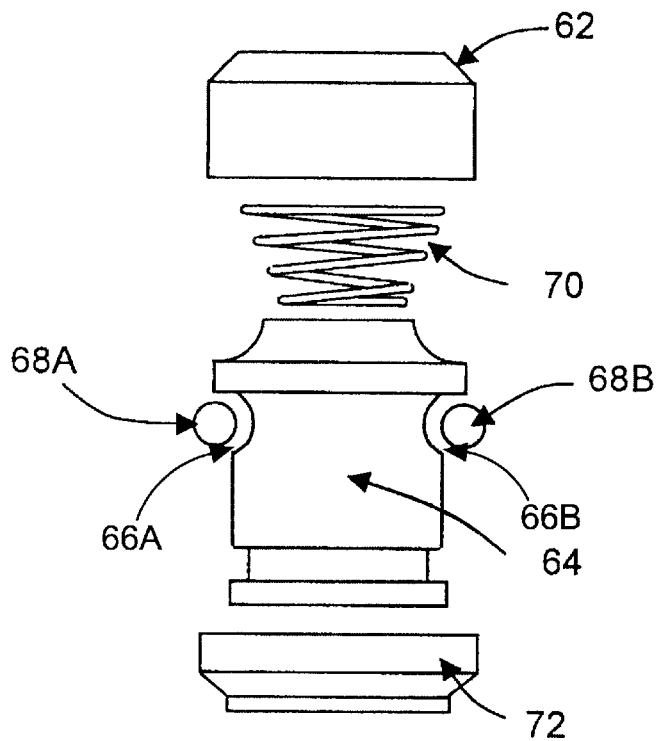
FIG. 8 is an exploded view of the snap fastener of the present invention.

The snap fastener 44 includes a cap 62, as shown in FIGS. 6 and 7. Preferably, the cap 62 is stainless steel. Further, as shown in FIG. 8, the snap fastener 44 includes a base 64, preferably a stainless steel barrel, having holes 66a and 66b lying in the same place orthogonal to the radial axis of the base and separated by 180° to accommodate latching balls 68a and 68b respectively. The holes 66a and 66b are sized to accommodate the respective balls 68a and 68b within two to three one thousandths inch tolerance. Preferably, the balls 68a and 68b are composed of silicon nitride. The snap fastener 40 also includes a spring 70 positioned between the top of the base 64 and the cap 62 to force the cap 62 away from the base 64. Further, the snap fastener 40 includes a capture ring or collar 72 sized to frictionally press fit into a lower portion of the cap 62. Preferably, the collar 72 is stainless steel. The collar 72 limits the movement of the cap 62 away from the base 64, and is shaped to move the balls 68a and 68b.

Figure 9B:
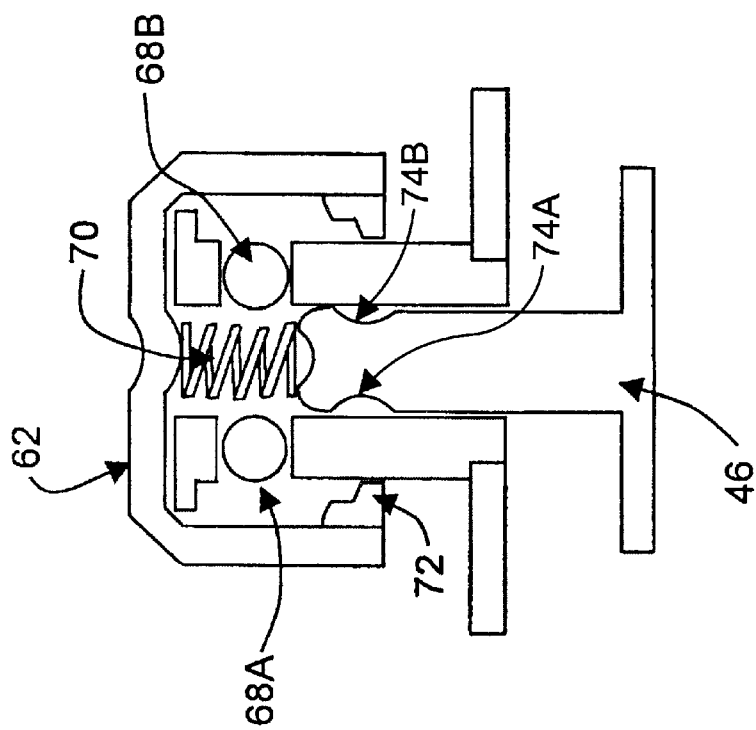
FIG. 9b is a cross section of view of the snap fastener disengaged from the stud.
Figure 9A:
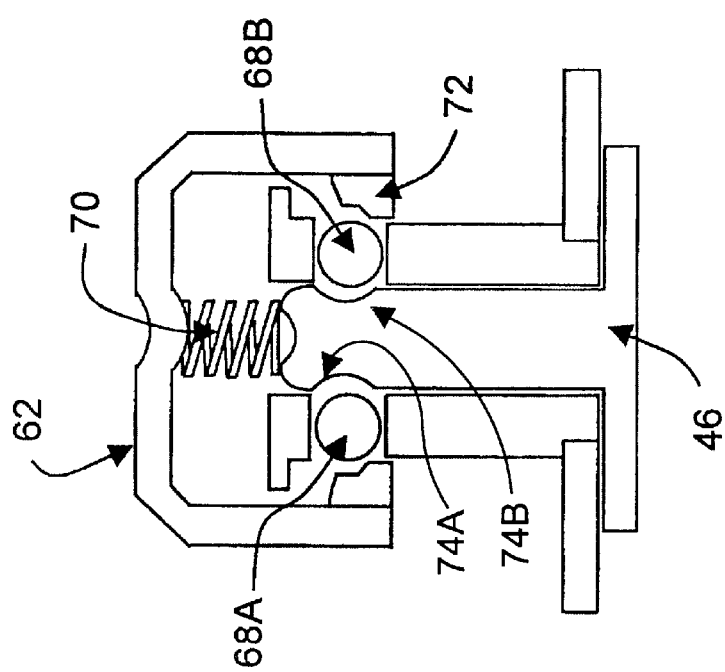
FIG. 9a is a cross section of view of the snap fastener while engaging a stud.

As shown in FIGS. 9a and 9b, the collar 72 is forced up toward the top of the base 64 by the spring 70, thereby forcing the balls 68a and 68b into the holes 66a and 66b to engage indented portions 74a and 74b respectively of the stud 46. This locks the snap fastener 44 to the stud 46. Likewise, the balls 68a and 68b are disengaged from the indent portion 74a and 74b of the stud 46 by pressing downwardly on the cap 62, allowing the balls 68a and 68b to roll outward from the base 64 into the cap 62 by pressing against the action of the spring 70.

The thermal insulation blanket 40 is installed as follows. First, the exterior hull 48 of the reusable space launch vehicle has a plurality of the studs 46 adhesively affixed to it. The relationship of the studs is arranged in such a manner that when the blankets 40 are positioned thereon, the entire surface of the hull 48 will be completely covered by adjacently positioned contiguous thermal insulation blankets 40.

Initially, the studs 46 are adhesively affixed to the hull 48, preferably with a silicon adhesive, such as Cytec™ FM300-2, or a film adhesive, such as Cytec™ FM3775 or Hysol EA9396C2. Next, the blanket 40, having one of the snap fasteners 44 located in each of the four mounting flanges 54 of the frame member 42, is aligned with its corresponding studs 46. Pressure is then applied to the blanket 40 at each of the corners to engage each of the studs 46 with the corresponding one of the snap fasteners 44. As shown in FIG. 9a, once the studs have been seated within the snap fastener 44, the indented portions 74a and 74b of each of the studs 46 will respectively engage with the balls 68a and 68b of the snap fastener, thereby locking the frame member 42 and hence the blanket 40 onto the hull/surface 48 of the reusable space vehicle. The installed blankets 40 can withstand over 180 dB of acoustic loads without disengaging from the surface 48 of the reusable launch vehicle.

After a mission, the thermal blankets 40 may be repaired or replaced by simply applying a specific pressure on the blanket 40 directly over each cap 62 of the snap fasteners 44 against the action of the spring 70 allowing the balls 68a and 68b to disengage from the stud 46. Thus, the blanket 40 is disengaged from the hull 48 without having to puncture the blanket 40 to get at the fastener device. Further, no tool is required to release the blanket 40. The blanket 40 is then removed and stored, serviced or replaced.

The present invention allows quick and reliable installation and disengagement of thermal insulation from a spacecraft. Further, the present invention provides a reliable mechanical means of engaging the blanket 40 to the surface of the hull 48 of a vehicle without causing the blanket 40 to sag. Also, the construction of the snap fasteners allows the engagement and disengagement of the blanket 40 to the surface of the hull 48 via the studs 46 to take place without the use of tools. Because no tools are required, no exposed portion of the mechanical engagement means is required, and the danger of a heat sink to the surface of the spacecraft is avoided.

While the invention has been described with reference to its preferred embodiment, it will be understood by those skilled in the art that various changes may be made and equivalents substituted for elements thereof without departing from the spirit and scope of the invention as recited in the following claims.

What is claimed is:

1. A thermally insulated spacecraft comprising:

a skin external to the spacecraft;

a plurality of studs affixed to said skin;

an insulating blanket for positioning over at least a portion of said skin, said blanket including:
  a frame member forming a shape having a plurality of corners;
  ceramic fiber batting supported by said frame;
  ceramic fabric cover sewn over said ceramic fiber batting;
  a mounting flange positioned in each of said plurality of corners of said frame member; and
  a snap fastener seated in each mounting flange for coupling said insulating blanket to said plurality of studs, said snap fastener having:
    a base intersecting said mounting flange, said base including a barrel having a length perpendicular to said frame member wherein said barrel has at least two orifices in a plane orthogonal to a radial axis of said barrel;
    a plurality of balls, each sized to fit a respective one of said at least two orifices;
    a fastener for holding a first end of the base onto said mounting flange;
    a cap positioned adjacent a second end of said base;
    a spring positioned between said cap and said second end, opposite of said first end, of said base; and
    a collar press fit into a lower portion of the cap to limit the movement of said cap from said base.

2. The thermally insulated spacecraft according to claim 1, wherein each of said plurality of studs includes a plurality of indents for engaging a respective one of the plurality of balls.

3. The thermally insulated spacecraft according to claim 1, wherein each of said plurality of studs comprises titanium.

4. The thermally insulated spacecraft according to claim 1, wherein said plurality of studs includes at least one of said studs for each corner of said insulating blanket.

5. The thermally insulated spacecraft according to claim 1, wherein each of said plurality of studs is adhesively bonded to said skin of said spacecraft.

6. The thermally insulated spacecraft according to claim 1, wherein said insulating blanket is 1 to 2 inches in thickness.

7. The thermally insulated spacecraft according to claim 1, wherein said frame member includes four corners.

8. The thermally insulated spacecraft according to claim 7, wherein said frame member includes three lengthwise members perpendicularly joined to two widthwise members, and wherein said mounting flanges are positioned at each of the four corners.

9. The thermally insulated spacecraft according to claim 8, wherein said ceramic fabric cover is sewn to cover and incorporate said lengthwise members and said widthwise members.

10. The thermally insulated spacecraft according to claim 1, wherein said fastener for holding the first end of said base comprises a locking clip.

11. The thermally insulated spacecraft according to claim 10, wherein said locking clip allows said base to float within said mounting flange from 20 millimeters to 30 millimeters to compensate for thermal expansion and to assist in placement of said insulating blanket.

12. The thermally insulated spacecraft according to claim 1, wherein the barrel of said base comprises stainless steel.

13. The thermally insulated spacecraft according to claim 1, wherein said plurality of balls are sized to fit their respective one of said orifices within 0.002 to 0.003 inches of tolerance.

14. The thermally insulated spacecraft according to claim 1, wherein each of said plurality of balls comprises silicon nitride.

15. A thermal insulating blanket for insulating a surface from extreme external temperatures, said blanket comprising:

ceramic fiber batting that insulates the surface from the external temperatures;

a frame for supporting said ceramic fiber batting and preventing said ceramic fiber batting from sagging;

a ceramic fabric cover enclosing said ceramic fiber batting and said frame, said ceramic fabric cover defining a first side of said blanket facing externally, and a second side opposite said first side and facing said surface; and a low profile fastener for coupling said blanket to said surface, said fastener coupled and decoupled from said surface by applying pressure to the first side of said blanket proximate said fastener.

16. The thermal insulation blanket according to claim 15, wherein said low profile fastener is completely covered by said ceramic cover and batting on the first surface to prevent heat transfer between the external temperatures and the fastener and partially exposed on the second surface for engagement with the surface.

17. The thermal insulation blanket according to claim 16, wherein said fastener includes a base which engages a stud affixed onto the surface.

18. The thermal insulation blanket according to claim 17, wherein said base includes a barrel having at least two holes positioned perpendicular to a longitudinal axis of the base, the holes containing a respective ball which is forced into frictional contact with an indent within the stud being engaged.

19. The thermal insulation blanket according to claim 18, wherein said ball is held in frictional engagement by a spring loaded cap and collar assembly, where said ball is released by pressing against the cap.

* * * * *